Jan. 5, 1965   C. A. PARKER   3,164,321
TAG BATCHING MEANS
Filed Dec. 14, 1962   5 Sheets-Sheet 1

INVENTOR.
CHARLES A. PARKER
BY
AGENT

Jan. 5, 1965  C. A. PARKER  3,164,321
TAG BATCHING MEANS
Filed Dec. 14, 1962  5 Sheets-Sheet 2

INVENTOR.
CHARLES A. PARKER
BY
AGENT

Jan. 5, 1965

C. A. PARKER 3,164,321

TAG BATCHING MEANS

Filed Dec. 14, 1962

INVENTOR.
CHARLES A. PARKER
BY
AGENT

Jan. 5, 1965
C. A. PARKER
3,164,321
TAG BATCHING MEANS
Filed Dec. 14, 1962
5 Sheets-Sheet 4
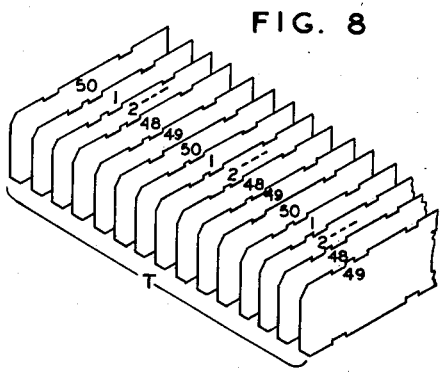
FIG. 8
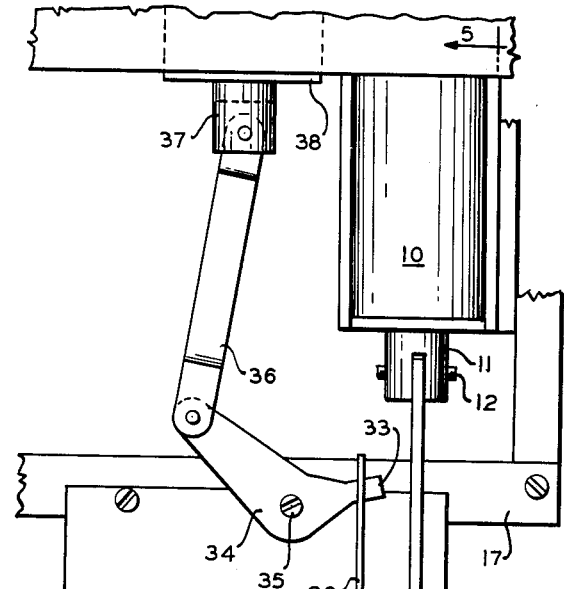
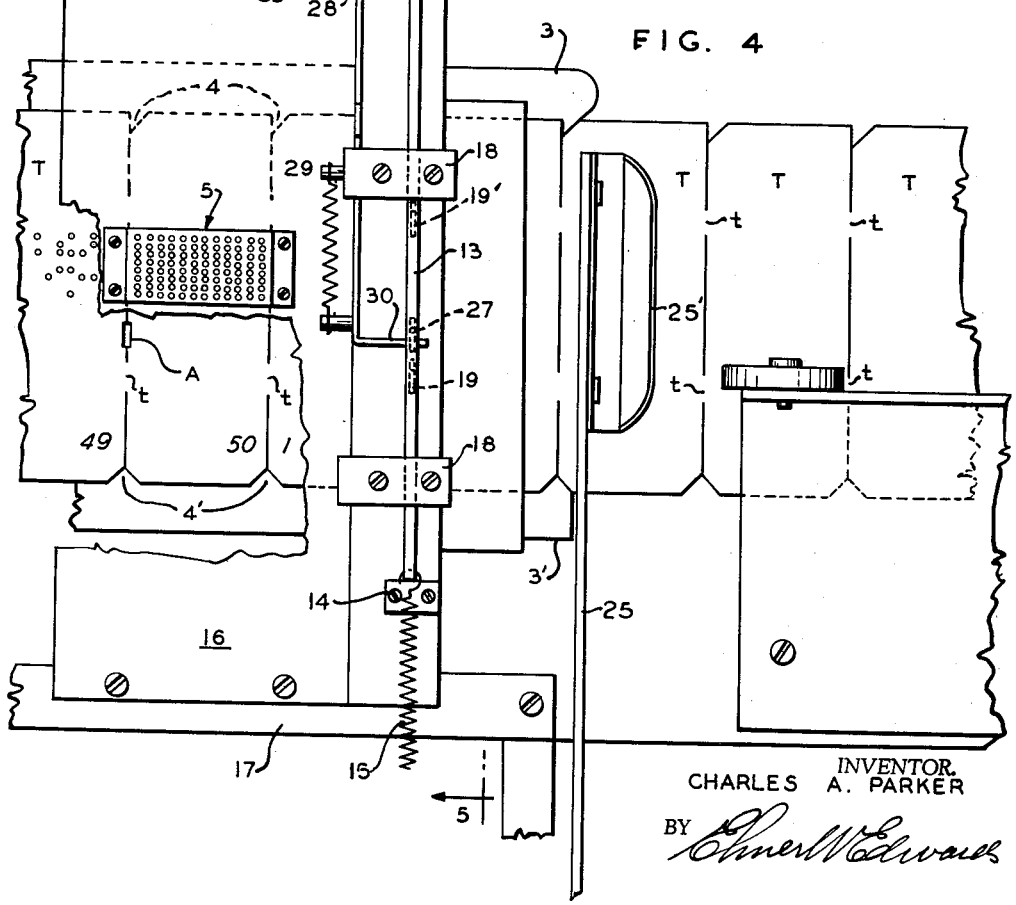
FIG. 4
INVENTOR.
CHARLES A. PARKER
BY *Elmer W. Edwards*
AGENT

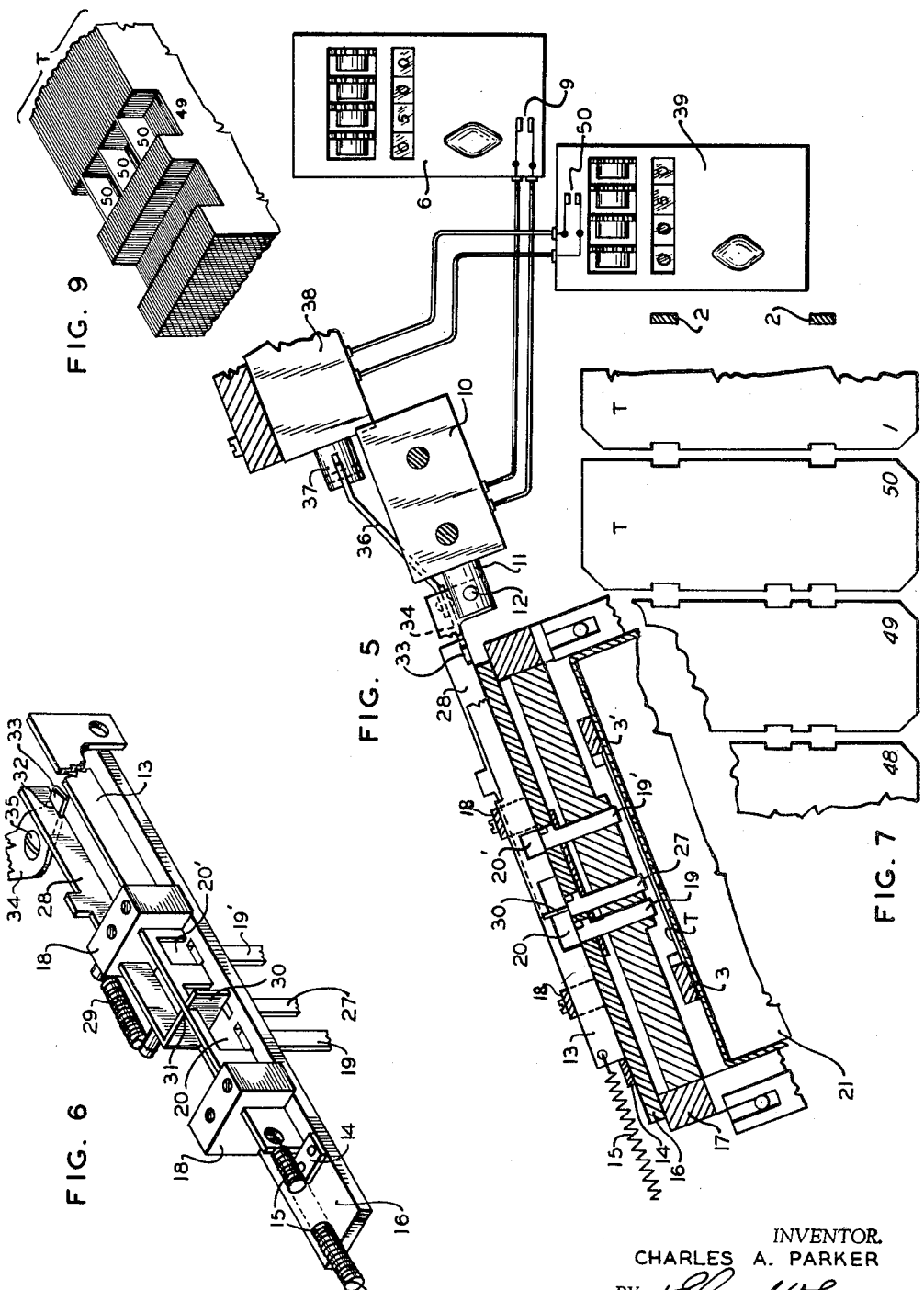

3,164,321
TAG BATCHING MEANS
Charles A. Parker, East Orange, N.J., assignor to A. Kimball Company, Brooklyn, N.Y., a corporation of New York
Filed Dec. 14, 1962, Ser. No. 244,642
9 Claims. (Cl. 234—18)

The present invention relates generally to a tag marking machine devised to print and perforate information upon small tags such as those used in the apparel industry for pricing garments and for keeping inventory records etc. More particularly, the invention relates to improvements in tag stacking means for said machines, such as that disclosed in my copending application No. 200,221 filed June 5, 1962, and entitled "Tag Stacking Device." Specifically the present invention provides improved means whereby tags fed seriatim from the feeding passage and successively stacked on edge in a row within a storage magazine will be caused to be automatically identified in selective groups or batches of tags, and wherein for any desired selected plurality of such tag batches a uniform number of tags will be comprised therein, as may be selectively predetermined.

Where a plurality of uniform lots of a similar article are required and each such article is to be individually tagged, a considerable amount of time heretofore is lost after affixing the tags in order to make a separate count of the number of articles comprising each lot. On the other hand if the number of tags for each batch are counted prior to such affixing it is necessary heretofore in order to identify each batch that the counter devices be reset each time for each of the separate batches to be counted.

An object of the present invention is to facilitate the tagging operations by the provision of means for automatically storing the tags as they are fed from the machine proper in such as manner as to form a plurality of tag batches with each batch including a similar selected number of tags.

Another object of the invention provides means for automatically forming a distinctive configuration to a given selected tag during a tag count control operation so that said tag is readily identified as separating one batch of tags from another.

Still further objects and advantages of the present invention will appear from the following description, reference being had to the accompanying drawings in which:

FIG. 4 is a fragmentary top plan view of the tag feeding devices and of the control means for the tag batch punch and the final tag cutoff punches.

FIG. 5 is a right side cross sectional elevation of the tag punch control devices, as taken substantially along line 5—5 of FIG. 4.

FIG. 6 is a detail perspective of the tag punch devices shown in FIG. 5.

FIG. 7 is a fragmentary top plan view showing the configuration of the individual tags after being severed.

FIG. 8 is an exploded perspective of a plurality of tags arranged in batch form.

FIG. 9 is an enlarged fragmentary perspective of said tags shown in normal batch form.

The present invention is shown as applied to a tag printing and perforating machine such as that shown and described in U.S. Patent Re. No. 24,547 issued October 7, 1958, to Karl J. Braun, from an original Patent No. 2,708,873 dated May 24, 1955, reference being had to said Reissue Patent No. 24,547 for details of structure and operation not herein set forth.

It is sufficient to say that in general for machines of the character to which the present invention is applied the tags are caused to be entered into the machine either as individual tags or in a continuous or web form and are thereafter fed past well-known printing and perforating means along the tag passage for the recording of selective data thereon. Where the tags are supplied in strip or web form, as shown in FIG. 4, they are made up of individual tag parts T with the tag parts severed from one another except for the lands indicated at $t$. However, as in the manner fully set forth in the above reference patent, a pair of suitable punch cutter means 2 (FIG. 7) during an upward and downward movement imparted to the tags for each cyclic operation of the machine will sever said lands just prior to an exit of any tag from the machine proper.

Figure 3:
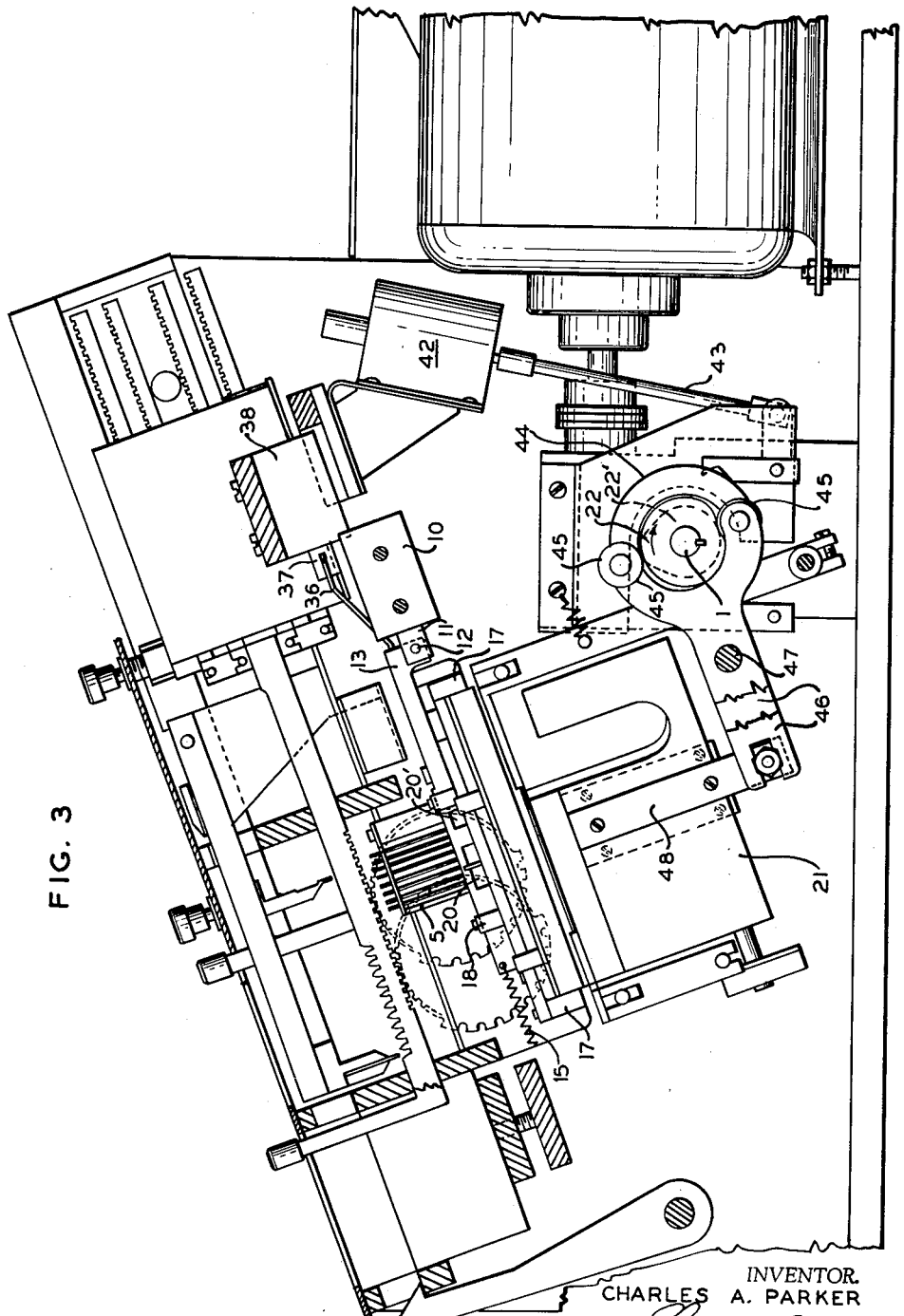
FIG. 3 is a right hand side elevation partly in vertical section of the machine, showing the cyclic means and control devices for the tag severing and batch indicating punches.

As shown in FIG. 4 the individual tags each have their forward corners and the near trailing corner cut off. By cutting off the corners in this fashion spaced notches are formed to enable the tags to be intermittently and successively fed through the machine by means of a pair of claw-like feeding bars 3–3' having spaced teeth 4 and 4' respectively for engaging said notches. The tag bars 3–3' are moved toward and from each other fore and aft of the machine and reciprocated in unison transversely of the machine upon operation of a cyclic power shaft 1 (FIG. 3) thereof when feeding tags through the machine. Said tag feeding means are also fully set forth in the above patent and reference may be had thereto for details of construction and operation not herein described.

To more readily set forth the general principles of operation of the machine let it be assumed that a merchandising establishment receives orders to transfer to each of ten branch stores a quantity of fifty garments of similar character. To each of said garments is to be secured one of the tags T, upon which certain pertinent information relative to article identification, price, etc., is entered as the tags are processed past suitable tag information perforating means 5 (FIG. 4), in the well known manner.

Figure 1:
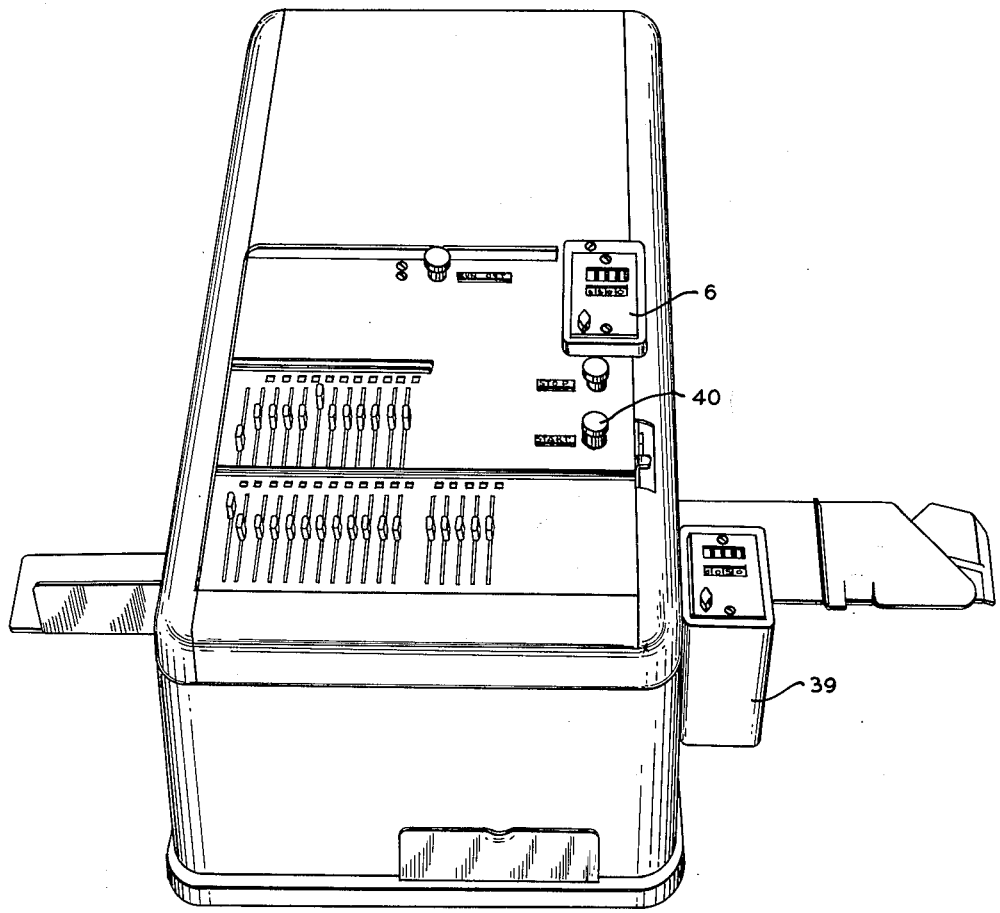
FIG. 1 is a front perspective view of a tag-marking machine embodying the features of the present invention.
Figure 2:
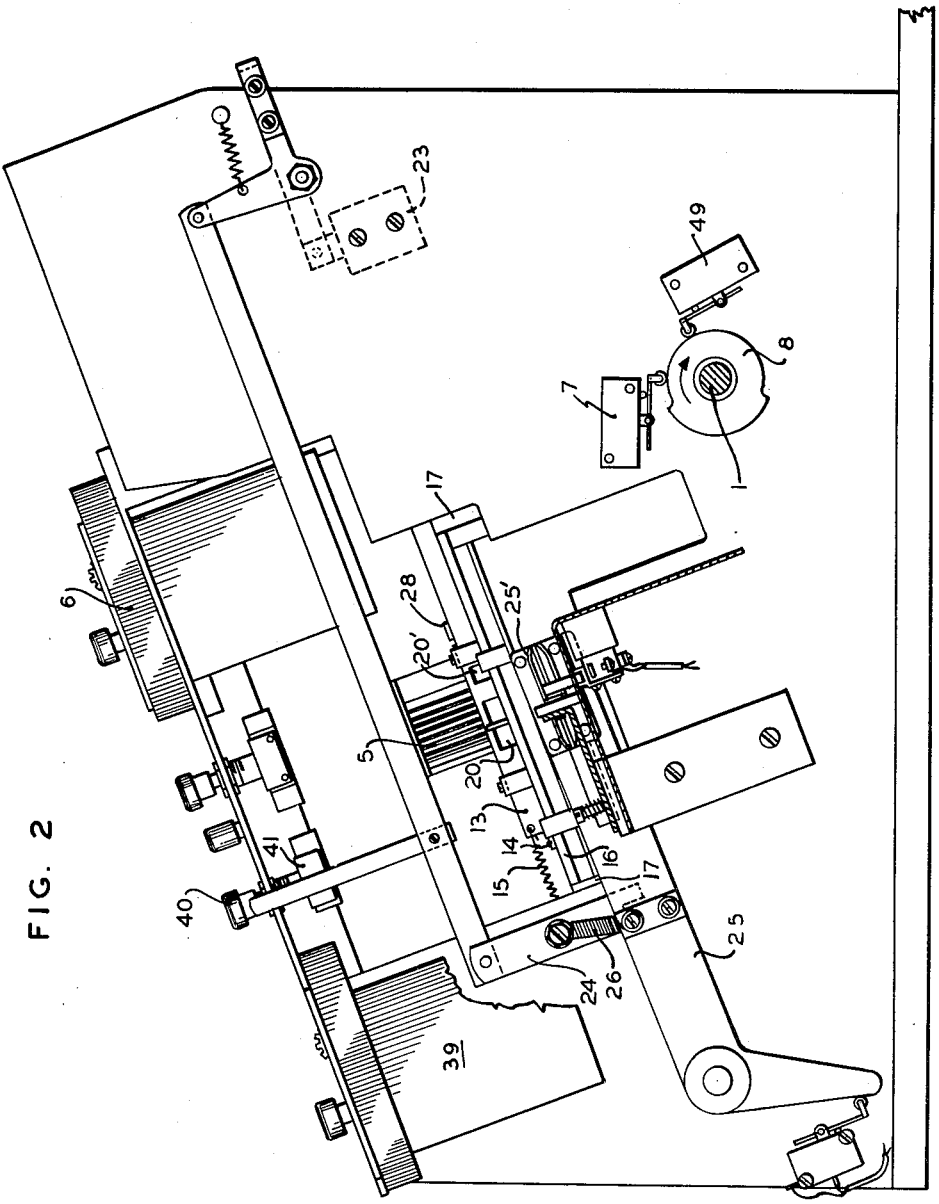
FIG. 2 is a right side elevation of parts on the right hand side frame together with the tag and batch counters.

Since there are to be fifty garments for each of ten destinations the operator will first manually adjust a suitable counter means 6 (FIGS. 1 and 2) until a total registering five hundred is indicated, representing the number of tags which are to be processed past the information punch station 5. Such counter means may be any one of the well known devices on the market and which provides that during each machine operation the counter may be indexed one step back toward zero registration, as an incident to engagement of a circuit switch 7 operable by suitable cam means 8 on the cyclic shaft 1 (FIG. 2). In the present instance as the said counter 6 reaches zero setting a circuit switch 9, illustrated diagrammatically in FIG. 5, is closed therein and effects an electrical impulse for energizing a solenoid number 10. Armature 11 of said solenoid has pivot connection 12 with a slide 13 normally held in leftward position and against a fixed stop member 14 by suitable spring means 15. Slide 13 is loosely mounted upon the upper surface of a stationary plate 16, carried by a cross frame 17. A pair of suitable guide blocks 18 (see also FIG. 6) serves to hold slide 13 for a horizontal sliding movement upon said plate and in the vertical plane of a pair of tag-cut-off punch members 19–19'. Punch members 19–19' are mounted for vertical sliding movement within the cross frame 17 and plate 16. The lower horizontal edge of slide 13 is notched out at 20–20' and said notches in the normal leftward position of said slide will be positioned directly above the said punch members 19–19' whereby the punch members are normally free to be lifted by engagement of a tag T therewith in an upward and downward reciprocation of a support frame 21 for the tags. Said support frame being operated by means of rock arms 46 operated by suitable complementary cams 22–22' (FIG. 3) operable upon each cyclic operation of the machine, in the well known manner hereinafter described and more fully set forth in the reference patent.

Upon the energizing of solenoid 10, however, incident to a final count back of the counter 6 to its zero registration, as above described, armature 11 of said solenoid will displace slide 13 rightwardly whereby the lower surface of said slide is now positioned directly above the respective pair of tag cut off punches 19–19'. Thus during the instant final operation, for the five hundredth tag according to the counter setting, said cut-off punches are held against upward movement of the tag, so that said punches will now act to sever this tag from the next adjacent tag at precisely the land point of attachment therewith, earlier described.

Coincident with the above final tag cut-off operation a solenoid 23 (FIG. 2) is also energized by the operation of switch 9 and will act to trip a latch member 24 from a pivoted guide lever 25. Said lever 25 includes a pair of parallel guide plates 25' (see also FIG. 4) between which the tags are fed. Upon release of latch 24 guide 25 under influence of a spring 26 rocks upwardly and serves to lift the said adjacent tag free of the feed claws 3–3', thereby preventing any further tags from feeding into the feed passage. Any tags, however, that still remain in the feed passage will continue to be advanced and subsequently are severed from each other at their land point of attachment by the punch members 2, during the lifting of each tag by the cyclic cam members 22–22', earlier described.

It is recalled that the garments to be tagged are to be arranged in lots of fifty, therefore the following special means are herein provided whereby the tags emitted from the machine proper will be automatically stacked in uniform batches of fifty tags to each batch in such manner whereby the operator may readily identify one batch from the other, and so by merely affixing each successive tag to a corresponding garment will know without need for counting that the proper number of garments are selected.

With reference to FIGS. 5 and 6, mounted for vertical sliding movement within the guides 16–17 is a special punch member 27, said punch being in vertical plane with and positioned between the punch members 19–19'. Mounted for slideable movement within the rightward guide block 18 is a second slide member 28, said slide being normally held in a rearward position by suitable spring means 29. The forward end of slide 28 includes a lateral projection 30 which extends through the opening 20 of the slide 13 and in the normal rearward condition of slide 28 will be positioned directly above the punch member 27, as shown in FIGS. 5, 6. A suitable notch 31 in the upper surface of projection 30 engaging the slide 13 serves as guide means for the forward end of slide 28. The rearward end of slide 28 is provided with a notch 32 engaging an arm 33 of a bell crank member 34 mounted for pivotal movement upon stud 35.

An opposite arm of bell crank 34 has link connection 36 (FIG. 5) with the armature 37 of a solenoid 38 under control, as hereinafter described, of a counter 39, said counter being similar to the counter 6 but in this instance being of the well known type provided with automatic value reset means whereby after zeroizing the counter will automatically return to any selected preset amount. Such counters are readily available on the market, one being the "Sodeco" counter (type TCeF4PE) as manufactured by the Swiss firm Sodeco Societe des Compteurs de Geneva, Geneva, Switzerland.

In the present example such a counter is first manually adjusted to the selected registration of fifty, as indicating the number of required tags for each batch. Both the total tag number tag counter 6 and the automatic value reset or batch control counter 39 having now been set to the desired registrations, as above set forth, a suitable cycle start key 40 (FIG. 2) is depressed by the operator. Depression of key 40 effects closure of a switch means 41 in circuit for energizing a solenoid 42 (FIG. 3) and through suitable link connection 43 therewith effects release of a suitable well known cyclic clutch 44 for rotating the main power shaft 1 in clockwise direction.

During said operation of shaft 1 the complementary cams 22–22' engage a pair of suitably spaced rollers 45 on the bifurcated arms of each of the left side and right side rock levers 46 supported near each end of the common pivot shaft 47 therefor. Rock levers 46 are connected by corresponding link members 48 to the box frame 21 upon which tags T are carried, as earlier described. Thus during cyclic operations of shaft 1 cams 22–22' will rock levers 46 and links 48 will act to lift frame 21 with tags T thereon first upwardly and thereafter downwardly. In the illustrated example herein, for the first forty-nine such cycles of operations the slides 13 and 28 remain in their normal set condition, shown and described in connection with FIG. 5, wherein the active tag each time engages the final cut-off knife members 19–19' but will merely lift said members idly within the recesses 20–20' of slide 13.

For slide 28, however, since projection 30 thereof is normally in position of engagement with punch member 27 said punch will be held against upward movement during the above operations. Thus for each successive operation an adjacent pair of tags is caused to be pierced thereby along their separating edges, in the manner illustrated at point A for the 49th and 50th numbered tags represented in FIG. 4.

During each machine cycle of operation cam 8 (FIG. 2) will effect closure of a suitable control switch 49 for impulsing the reset counter 39 in a step by step return operation to zero setting. At said counter in the fiftieth cycle of operation, representing the final tag of a batch, is adjusted to zero setting a suitable circuit control switch 50 (FIG. 5) controlled thereby will effect energizing of the solenoid 38. As earlier described energizing of solenoid 38 will act to impart a leftward movement to the slide member 28 and projection 30 of said slide is now carried thereby free of the path of movement of the batch indicating punch member 27. Thereafter as complemental cams 22–22' (FIG. 3) in the fiftieth cycle of operation lift the tag elevating frame 21 the particular tag thereon (50) together with the next adjacent tag (1) (if there be one) in rising therewith will engage and merely lift the punch member 27 idly within the opening 20 of the slide 13, so that no perforation is effected at this time by said punch.

It will be recalled that in the ejection of the tags from the machine proper a pair of punch members 2, in line with the lands t of the tags T, serve as cyclically operable cut-off knives for severing each of the successive tags from the other. As in the manner fully set forth in my copending application No. 200,221, each of the tags thereafter during ejection are stacked on edge to form a horizontal stack pile.

From the above description, and with particular reference to FIGS. 8–9, it will be noted that the top edges of the tags when stacked now present a configuration wherein each of the first selected forty-nine tags for each batch is cut away along the top edge to form three distinct notches therealong, while each particular tag (50) terminating the selected number of tags for a required batch will include but two such notches. Thus it will be obvious that the corresponding edge portion of each end of a batch tag (50) is readily identifiable in manner whereby an operator may now easily separate the preselected number of tags comprising a desired batch and thereafter by securing each individual tag thereof to the corresponding article will without need of counting determine when the proper quantity of articles have been selected for completing the required lot.

It is obvious also from the above description that placing of the punch member 27 whereby to indent the opposed edges of adjacent tags permits upon stacking of the individual tags an identification of each batch of tags from either of opposite sides of the stacked tags.

When desired, however, by merely shifting punch member 27 slightly to coincide with a single tag only one edge of each tag is now caused to be indented thereby.

While a particular embodiment of the invention has been shown and described it will be apparent to those skilled in the art that numerous variations and modifications may be made in the particular construction without departing from the underlying principles of the invention. It is therefore desired, by the following claims, to include within the scope of the invention, all such variations and modifications whereby substantially the results of the invention may be obtained by the use of substantially the same or equivalent means.

The invention claimed is:

1. In a tag processing machine including means for feeding and ejecting successive tags therefrom to form a stack pile within a magazine, the combination therewith of means for differentiating said tags in batch form said means comprising:

a tag perforating punch normally operable in successive operations thereof to indent an edge portion of the successively fed tags;

a control member adapted for adjustment to selective positions for disabling and enabling the said indenting operations of said punch;

operating means for said control member;

a counter selectively settable for determining a selected number of tags to comprise ab atch;

means operable during successive operations of said punch for stepping said counter to zero registering condition;

and means operable by said counter upon movement to zero registering condition for effecting operation of said operating means to automatically adjust said control members for disabling the successive indenting operations of said punch in a given operation thereof corresponding in number to any said selected amount as set up on said counter.

2. In a tag processing machine including means for successively feeding and ejecting tags therefrom to be stored in stack formation upon a magazine, the combination therewith of means for automatically differentiating said tag stack as a plurality of tag batches having a uniform selected number of tags for each batch and comprising:

a tag perforating punch for indenting an edge portion of said successively fed tags;

a control member for said punch normally positioned for cooperation therewith in manner to enable said punch for indenting operations;

electromagnetic means adapted for displacing said control member free of cooperation with said punch whereby to disable said punch against an indenting operation;

a tag batch counter settable to selective amounts;

means for stepping said counter to zero registering condition during successive tag feeding operations;

circuit means for energizing said electromagnetic means upon a zeroizing of said counter and thereby adjust said control member to prevent an indenting operation of said punch member relative to a given selected tag according to said counter setting;

and in which the uncut edge of said tag thereby serves to identify tag batches having a corresponding number of tags in accordance with said counter setting.

3. In an apparatus of the class described for feeding strip or web tags successively past an information processing station the combination comprising;

tag severing means operable in successive feeding operations to sever a leading tag from the next adjacent tag;

a magazine for receiving and storing the successive tags in stack pile formation;

a punch member for indenting conjointly edges of an adjacent pair of tags;

punch enabling means normally conditioned for maintaining said punch member active during successive tag feeding operations;

a control counter settable to selective amounts for determining a number of successive operations of said punch member;

control means for counting back said counter to zero registering condition in step by step manner with each tag feeding operation;

and means under control of said counter adapted upon completion of said count-back for disabling said punch enabling means and thereby prevent an operation of said punch relative to a selected tag in accordance with said counter setting.

4. In an apparatus of the class described adapted for processing information upon a continuous strip of tags joined in web form, the combination comprising:

feed devices for said tags including cyclic operating means therefor;

means operable in an operation of said cyclic operating means for severing each preceding tag from a subsequent adjacent tag;

and wherein said severed tags are subsequently ejected in successive manner by said feed means to be stored in stacked manner;

a punch member normally operable in the successive operations of said cyclic means to effect a perforation overlapping the conjoining edges of successive pairs of adjacent tags;

a counter settable manually to selective amount settings and including means adapted for step by step operation under control of said cyclic devices whereby to restore said counter to zero registration condition;

and means controlled by said counter upon operation to zero registration condition for determining an idle operation of said punch member, whereby no perforation is effected thereby upon the conjoining edges of a pre-selected pair of adjacent tags as determined by said amount setting of said counter, so that the particular pair of tags corresponding to said setting is readily identified as separating a stack of said tags equivalent in number to the said selected amount.

5. In an apparatus of the class described having intermittent feed devices for advancing tags joined in strip or web fashion to the next succeeding tag;

means operable for severing a leading tag from an adjacent tag incident to each feeding operation, and a storage magazine wherein the severed tags are deposited to form a stack pile, the combination therewith of:

normally effective punch means adapted for each successive operation of the feed devices to effect a perforation along the conjoining edges of successive adjacent pairs of said tags;

a manually adjustable counter settable to selective amounts for determining the number of active perforating operations of said punch means;

control means for restoring said counter step by step to zero registration condition during successive perforating operations;

and means controlled by said counter upon movement to zero registering condition for disabling said normally effective punch means whereby no perforation is effected thereby to a tag corresponding to the selected amount setting of said counter register.

6. In an apparatus of the class described for sequentially feeding tags joined by web portions thereof in a continuous strip manner past an information processing station in combination therewith:

tag cutting punch members operable cyclically for perforating said web portions and thereby severing the successive adjacent tags;

a magazine for receiving and storing said severed tags in stack pile manner;

a tag batch identifying punch;

a settable member normally in position for rendering said identifying punch active, whereby pairs of successive tags are caused to be perforated thereby along their conjoining edges;

electromagnetic means for displacing said settable member to an inactive position relative to said identifying punch member, whereby said punch is rendered inactive to tag perforation;

a counter settable to selective amounts;

control means for indexing said counter one step back toward zero setting for each tag feed operation;

and circuit means operable upon zeroizing said counter for effecting an operation of said electromagnetic means.

7. In an apparatus of the class described adapted for successively feeding past an information station a continuous strip of tags each joined by means of land or web portions to the adjacent tags;

tag feeding devices;

cyclic operating means therefor;

and punch members related to said web portions adapted during each operation of the cyclic means for perforating out said web portions so that said tags are successively ejected in individual manner for stacking, the combination therewith of:

a punch member adapted for punching an indenture along the edge portion of said successively fed tags;

a tag batch counter settable to selective amounts whereby to determine a selected number of said tags for comprising the batch to be so indented;

control means for displacing said counter a unit step toward zero setting for each operation of the cyclic means;

a shiftable blocking member for said punch normally positioned whereby said punch is active for perforating operations;

electromagnetic means for displacing said blocking member whereby to disable said punch;

circuit control means therefor operable as said index counter moves to zero registering condition for energizing said electromagnetic means and thus to disable said punch, so that no indenture perforation is effected to a given selected tag in accordance with the amount setting of said counter and in which said tag is thereby distinctive from other tags of the stack and so identifies a corresponding batch of said tags.

8. The invention according to claim 7 including:

reset means whereby said tag batch counter is automatically restored to any said selected set amount following the said zeroizing thereof and so provides for a successive series of tag batch control operations.

9. The invention according to claim 8 and including:

a tag total counter presettable for determining any total number of tags to be fed past the information station;

a punch means under control of said counter and adapted for severing the tag joining webs relative to a final tag, as determined by a final movement to zero setting of said total tag counter;

control means operable by the cyclic operating means for restoring said counter step by step to zero registration condition;

and means thereupon operable by said counter for effecting operation of said final tag cut-off punch means.

References Cited in the file of this patent

UNITED STATES PATENTS

| | | |
|---|---|---|
| 1,450,427 | Cannard et al. | Apr. 3, 1923 |
| 2,622,804 | Hamisch | Dec. 23, 1952 |
| 2,754,751 | Marsh et al. | July 17, 1956 |
| 2,821,915 | Katz | Feb. 4, 1958 |